(No Model.)
W. G. VERNON.
LAWN-MOWER.
No. 524,077.  Patented Aug. 7, 1894.
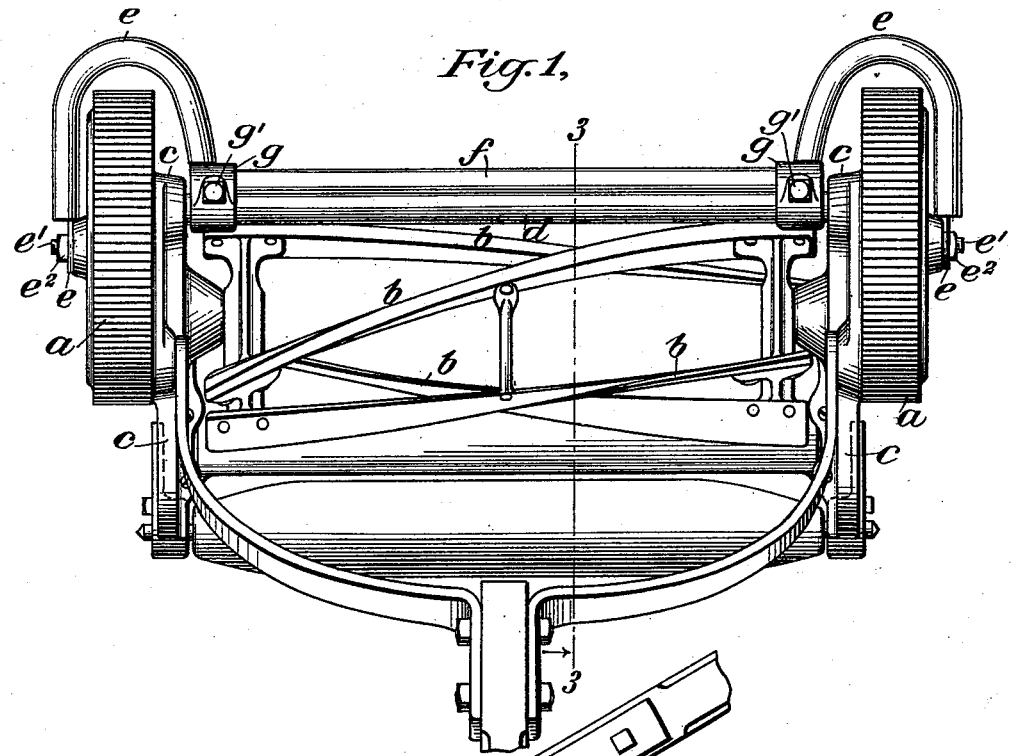
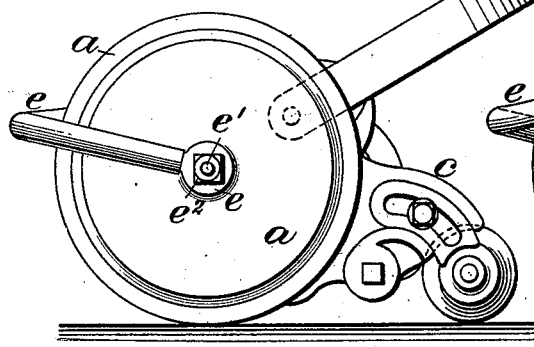
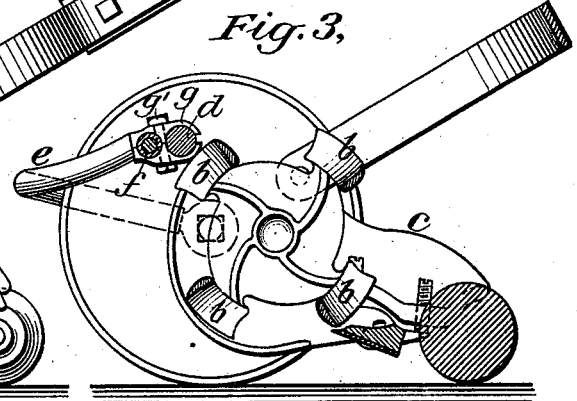
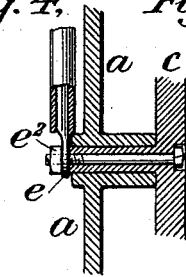
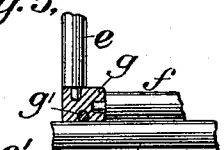
Witnesses:-
D. H. Hayward
E. M. Taylor
Inventor:-
William G. Vernon
By Redding & Kiddle
Attys.

UNITED STATES PATENT OFFICE.

WILLIAM G. VERNON, OF PHILADELPHIA, PENNSYLVANIA, ASSIGNOR TO THE PHILADELPHIA LAWN MOWER COMPANY, OF SAME PLACE.

LAWN-MOWER.

SPECIFICATION forming part of Letters Patent No. 524,077, dated August 7, 1894.

Application filed March 24, 1894. Serial No. 504,929. (No model.)

*To all whom it may concern:*

Be it known that I, WILLIAM G. VERNON, a citizen of the United States, and a resident of the city and county of Philadelphia, State of Pennsylvania, have invented certain new and useful Improvements in Guards or Fenders for Lawn-Mowers, of which the following is a specification, reference being had to the accompanying drawings, forming part hereof.

This invention relates to lawn mowers and is embodied in a guard or fender for the same.

The object of the invention is to effectively guard and protect the parts of the lawn mower from injury when brought into contact with stone work, statuary, monuments, trees, &c., as well as to prevent injury to trees, shrubs, &c., from contact with the mower.

This invention also aims to produce a guard or fender of simple construction and effective in operation and capable of attachment to any ordinary lawn mower.

The guard or fender embodying this invention has two end pieces that pass around in front of the respective wheels, and are supported on the ends of the axles of the wheels and on the girt or frame of the machine. It also has a center piece which extends across the front of the machine from one end piece to the other, so that the end pieces and center piece form a guard or fender extending from the axle of one wheel and on either side of and in front of that wheel, and across the front of the machine, and on either side of and in front of the other wheel, and finally terminating at the other axle. These pieces have a core or supporting piece of metal or other suitable strong material, and a covering of rubber or other suitable elastic material, so that they have a soft and yielding and elastic surface and a strong support or core. The guard or fender is detachably attached to the lawn mower and the same clamping devices that hold the inner ends of the end pieces also hold the outer ends of the center piece. The end pieces are in arched or loop form where they pass around the wheels and as a result of this form the metal cores have a limited amount of yielding and elastic action in addition to the elasticity and yielding character of the surface covering. The core of the center piece also has a very limited yielding and elastic action. In the case of heavy blows or concussions the elasticity of these cores materially aids in cushioning the blows and preventing injury to either the lawn mower or the object with which it comes in contact.

In the accompanying drawings an embodiment of the invention is illustrated.

Figure 1 is a plan view of a lawn mower having attached thereto a guard or fender embodying the invention. Fig. 2 is a side elevation of the same. Fig. 3 is a vertical section of the same taken on the line 3—3 Fig. 1. Fig. 4 is a horizontal section of one of the axles and a portion of the wheel and end piece and shows the manner in which the end piece of the guard or fender is secured to the axle. Fig. 5 is a horizontal section of one of the clamps that hold the inner ends of the end pieces and the outer ends of the center piece.

The lawn mower is not completely shown in the drawings, the handle being partly broken away in Fig. 1 and other parts of the machine not being shown in the other views. This lawn mower is of ordinary construction and in its place any lawn mower of ordinary construction could be used. It is therefore unnecessary to particularly describe it. The wheels $a, a$, are mounted upon axles at either side of the front of the lawn mower and are suitably connected to the rotating knives $b, b$, so as to actuate the same when the lawn mower is pushed over the ground. The side frames $c, c$, are connected at the front of the machine by the cross bar or girt $d$.

My improved guard or fender comprises the end pieces or guards $e, e$, and the center piece or guard $f$, and the clamps $g, g$. The end guard pieces $e$ and the center guard piece $f$ are each composed of a core or support of strong material such as iron or steel, and a covering of soft and yielding and elastic material such as rubber, and may be very simply constructed by covering the cores with rubber tubing. In some cases however, the soft and yielding covering may be partly or wholly dispensed with. The outer end of each end guard piece is widened and perforated so as to fit against or over the end of each respective axle or a bolt or stud extending out from said axle, or is otherwise suitably secured to the gudgeon or axle of the wheel. In the construction shown (see particularly the section Fig. 4), the bolt $e'$ extends through the axle and through the end of the end guard piece and the end guard piece is clamped against the face of the axle by means of a nut $e^2$ on the end of said bolt and the enlarged end of the end guard piece acts as a washer to prevent the wheel from moving off the end of the axle. The end guard pieces are arched or curved or bowed in passing from the axle to the front of the wheel and around the wheel and back again on the inner side of the wheel.

The inner end of each end guard piece $e$ is held by the clamp $g$ (see Fig. 5), which is shown as a split clamp made of two parts and so shaped that these two parts hold between them the cross piece or girt $d$ of the frame, the inner end of the end guard piece $e$ and the outer end of the center guard piece $f$, and these two parts of the clamp are detachably held together by the bolt and nut $g'$. This clamp $g$ thus connects the center guard piece and end guard pieces together and connects the center and end guard pieces to the frame of the lawn mower. It may be readily detached by loosening the clamping nut and thus releasing the various parts held by it, while the outer ends of the end guard pieces may be detached by removing the nuts $e^2$; and if an ordinary washer is substituted in place of the enlarged end of each end guard piece $e$, the machine shown may be used as ordinarily without the guard or fender; thus it will be seen that the various parts of my improved guard or fender can be readily attached to and removed from the lawn mower and can be readily taken apart for repair or renewal of any part, as for instance, for renewal of the rubber tubes or coverings of the center piece or end pieces in case the coverings have become cut or worn or otherwise unsuitable for use.

It will be seen that my improved guard or fender affords a complete and effectual protection to the working parts of the machine and to anything in which the machine would come in contact in use. As the machine is pushed forward over a lawn, it very frequently happens that an obstacle is met at the extreme sides of the machine which would injure the machine or would be injured by the machine, but my improved guard is effective in cushioning the shock or concussion against an object thus situated and as it is also effective when the middle portion of the machine comes in contact with the object, it will be seen that the protection afforded by my improved guard or fender is complete and effectual under all conditions of use.

With a machine unprovided with my improved fender, it is extremely difficult to work close to a border of shrubbery or in fact any sort of a border, because of the fear of abrasion or other injury resulting from contact of the machine with any part of the border, but with my improved fender these dangers are obviated and the machine may be operated as close to the border as is desirable without fear of injury to the machine or to the shrubbery or the wall or whatever constitutes the border. The same is true when the object is in front of the machine; the machine can be pushed forward as far as it will go without fear of injury. Thus with my improvements it is possible to operate with great rapidity and perfect safety in the performance of all close work. So also when lawns are rough or there is a probability of encountering stones or other obstacles, the mower may be operated rapidly and without fear of injury since no matter where the machine may strike the obstacle there is no fear of injury either to the machine or to the object struck by it.

The arched form of the end pieces of the guard or fender, and the fact that they are held at their ends allow a certain amount of yielding action to the cores of the end pieces. For instance, in the case of a heavy blow at the side of one of the end pieces this yielding action and elasticity would be highly useful in preventing injury. It will also be noted that by reason of the manner of holding the end pieces and the location of their supports in what is practically the base of a triangle, as indicated in Fig. 3, there is no fear of displacement of the end pieces as a result of any blows to which they would be subjected while in use.

It is evident that various modifications could be made in the construction, as for instance, additional supports could be provided for the guard or fender or the shape of the parts of the guard or fender could be altered. The center piece could be arched instead of being straight as shown, and the end pieces might be otherwise shaped. The soft and yielding coverings might be thickened at places or not used at other places on the guard pieces, or the guard pieces might be composed wholly of a material which possessed a surface of the character desired. It is also evident that parts of my invention may be used separately, or in connection with other parts of different construction; for instance, the end guards or wheel guards might be used separately. I do not therefore limit my invention to the specific construction shown, but

What I claim, and desire to secure by Letters Patent, is—

1. In a guard or fender for lawn mowers, an arched guard adapted to be secured upon the end of the axle and to extend around in front of a wheel and provided with a clamp adapted to detachably hold it to the frame of the machine, substantially as set forth.

2. In a guard or fender for lawn mowers, the combination of a center guard piece extending across and in front of the frame of the lawn mower, arched end guard pieces extending around in front of the wheels, clamps detachably holding together the ends of the center guard and the inner ends of the end guard and a portion of the lawn mower, and means for securing the outer ends of the end guards to the respective axles, substantially as set forth.

3. In a guard or fender for lawn mowers, the combination of a center guard piece extending across and in front of the frame of the lawn mower, arched end guard pieces extending around in front of the wheels, said guards having soft and yielding surfaces, clamps detachably holding together the ends of the center guard and the inner ends of the end guard and a portion of the lawn mower, and means for securing the outer ends of the end guards to the respective axles, substantially as set forth.

This specification signed and witnessed this 20th day of March, A. D. 1894.

WILLIAM G. VERNON.

In presence of—
R. S. REED,
R. S. HOAGLAND.